| United States Patent [19] | [11] Patent Number: 4,828,816 |
| Kostylkov et al. | [45] Date of Patent: May 9, 1989 |

[54] PROCESS FOR PRODUCING SULPHUR FROM CALCIUM SULPHATE

[75] Inventors: Igor G. Kostylkov; Oleg V. Rogachev, both of Moscow; Igor A. Zhukov, Moskovskaya; Vladimir V. Zhizhin; David N. Soschin, both of Moscow, all of U.S.S.R.

[73] Assignee: Nauchno-Proizvodstvennoe Obiedinenie "Tekhenergokhimprom", Moscow, U.S.S.R.

[21] Appl. No.: 929,065

[22] Filed: Nov. 7, 1986

[51] Int. Cl.$^4$ ............................................. C01B 17/00
[52] U.S. Cl. ............................. 423/567 A; 423/567 R
[58] Field of Search ......................... 423/567 R, 567 A

[56] References Cited

U.S. PATENT DOCUMENTS

| | | | |
|---|---|---|---|
| 2,011,039 | 8/1935 | Gothers | 423/567 |
| 3,726,957 | 4/1973 | Lind | 423/638 |
| 3,729,551 | 4/1973 | Gorin | 423/555 |
| 3,796,628 | 3/1974 | Sev | 423/638 |
| 3,932,586 | 1/1976 | Guerrieri | 423/567 R |
| 4,041,141 | 8/1977 | Moss | 423/571 |
| 4,078,048 | 3/1978 | Nadkarni | 423/567 A |
| 4,098,639 | 7/1978 | Noreus et al. | 423/567 R |
| 4,520,002 | 5/1985 | Willis, Jr. | 423/567 R |

OTHER PUBLICATIONS

"Sulphur", The British Sulphur Corp. Ltd., No. 147, Mar./Apr./1980, pp. 36–38, Hill et al.

*Primary Examiner*—H. M. S. Sneed
*Assistant Examiner*—Helane Myers
*Attorney, Agent, or Firm*—Burgess, Ryan and Wayne

[57] ABSTRACT

A process for producing sulphur from calcium sulphate wherein a charge is granulated from powder-like calcium sulphate and a carbonaceous component at a mass ratio of carbon of the carbonaceous component to calcium sulphate of 0.08–0.09:1 respectively; mixing of the resulting charge granules with a lump-like carbonaceous material at a mass ratio of carbon of the carbonaceous material to the charge granules (as calculated for dry solids) equal to 1:3–10 respectively; heating the mixture of the charge granules with the lump-like carbonaceous material in a vertical calcination furnace while continuously moving said mixture in a downward current simultaneously with counter-currently supplying an oxygen-containing gas; the maximum heating temperature being maintained within the range of from 1,100° to 1,200° C. and the temperature of the upper bed of said mixture in the furnace being maintained equal to 500°–600° C.; condensing sulphur vapors from the reaction sulphur-containing gases effluent from the top section of the furnace.

10 Claims, No Drawings

PROCESS FOR PRODUCING SULPHUR FROM CALCIUM SULPHATE

FIELD OF THE INVENTION

The present invention relates to the chemical technology of inorganic substances and, more specifically, to processes for producing sulphur from calcium sulphate.

Sulphur is used mainly for the production of sulphuric acid which is useful, in particular, in the production of phosphoric acid by the extraction method.

The starting calcium sulphate can be used in the composition of phosphogypsum (production waste from the process for the manufacture of extraction phosphoric acid) or natural gypsum, or as natural anhydrite, or in composition of mixtures of the above-mentioned substances.

BACKGROUND OF THE INVENTION

Known in the art is a process for producing sulphur from sulphates of alkali-earth metals of the $Me_x(SO_4)_y$ type by way of treatment thereof with a gas mixture containing CO and $CO_2$ at a temperature of 2,000° to 3,000° F. (1,090°–1,650° C.), a volume ratio of $CO_2/CO$ of not less than 3 and at a volume concentration of CO of at least 5%; the molar ratio of $(CO+CO_2)$ to calcium sulphate being maintained equal to at least 3y:1, while the process being conducted under a pressure of from 0 to 25 psig (0 to 7 Atm) (cf. U.S. Pat. No. 3,726,957).

This prior art process has a disadvantage residing in that the reduction of sulphates of alkaliearth metals by carbon monoxide under the above-specified conditions at a temperature below the agglomeration temperature of the starting stock proceeds mainly according to the reaction (exemplified by calcium sulphate):

$$CaSO_4 + CO = CaO + SO_2 + CO_2 \quad (I),$$

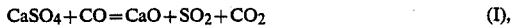

sulphur is recovered predominantly as sulphur dioxide and its yield in elemental form is not high (40–50% of its content in the starting material) which makes the process economically ineffective.

Also known in the art is a process for producing sulphur from metal sulphates by treating particles of these raw materials in a furnace with two fluidized beds positioned one under another so that in the lower fluidized bed the raw materials are treated with a heated gas containing free oxygen, whereas in the upper fluidized bed consisting of a carbon-containing agent such as coke the reduction of sulphur dioxide formed in the lower bed is carried out to obtain elemental sulphur at a temperature of from 600° to 1,250° C. according to the reaction:

$$SO_2 + C = S + CO_2 \quad (2)$$

(cf. U.S. Pat. No. 4,041,141).

A disadvantage of this process resides in that for the treatment of calcium sulphate it is necessary to keep high temperatures in the lower fluidized bed (within the range of from 1,250° to 1,350° C.) and use raw materials in the form of fine particles which results in a high degree of dusting of the reaction sulphur-containing gases, fusion and agglomeration of the raw materials containing contaminants which, in turn, inevitably impairs the fluidization conditions and results in stoppage of the formation of sulphur. Furthermore, the use of temperatures within the range of from 600° to 1,250° C. in the process to reducing of sulphur dioxide to elemental sulphur lowers the balanced yield of elemental sulphur.

Known in the art is a process for producing sulphur from calcium sulphate (a mixture of phosphogypsum and natural gypsum) involving granulation of a charge from powder-like calcium sulphate and a carbonaceous components such as coke or light-weight coals, heating of the resulting charge granules in a vertical calcination furnace at a continuous movement of these granules in the furnace in a continuous current directed downwardly with a simultaneous supply of a counter current of an oxygen-containing gas, such as air, so that maximum temperature of heating of the charge granules is maintained within the range of from 1,100° to 1,200° C., and condensation of sulphur vapours from the reaction sulphur-containing gases effluent from the furnace top section. In the stage of the charge granulation the mass ratio of carbon in the carbonaceous component to calcium sulphate is maintained equal to 0.25:1; the ash content of coke and light-weight coals is usually within the range of from 6 to 13% (cf. "Sulphur", 1980, No. 147, p. 36–38).

This prior art process has a disadvantage residing in an insufficient yield of elemental sulphur (75% of its content in the starting material) due to the fact that the access of air oxygen into the granules during the heating is hindered and oxygen has not time to react with carbon according to the reaction:

$$2C + O_2 = 2CO \quad (3)$$

As a result, an excessive amount of calcium sulphide is formed in the granules which calcium sulphide prior to leaving the lower section of the furnace is enriched with oxygen of an oxygen-containing gas according to the reaction:

$$CaS + 2O_2 = CaSO_4 \quad (4)$$

which lowers the yield of the sulphur product. Furthermore, impurities of phosphates and fluorides in phosphogypsum form liquid phases upon heating which migrate to the surface of the charge granules thus resulting in agglomeration of granules, hindering of reduction of calcium sulphate and reducing the yield of the final sulphur product.

SUMMARY OF THE INVENTION

It is an object of the present invention to provide such a process for producing sulphur from calcium sulphate which would make it possible to increase yield of elemental sulphur.

This object is accomplished by a process for producing sulphur from calcium sulphate which comprises granulation of a charge from powder-like calcium sulphate and a carbonaceous component, heating of the resulting charge granules in a vertical calcination furnace at a continuous downward movement of these granules simultaneously with a counter-currently supplied oxygen-containing gas; the maximum temperature of heating of the charge granules being maintained within the range of 1,100° to 1,200° C., and condensation of sulphur vapours from the sulphur-containing reaction gases, wherein, according to the present invention the charge granulation is effected at a mass ratio of the carbonaceous component to calcium sulphate of 0.08–0.09:1 respectively; prior to heating the granules are intermixed with a lump carbonaceous material at a mass ratio of carbon of the carbonaceous material to the charge granules, as calculated for dry solids, equal to 1:3-10 respectively and the temperature of the upper layer of a mixture of the charge granules with the lump carbonaceous material is maintained in the furnace equal to 500°-600° C.

To impart a required mechanical strength to the charge granules during the heating process, as well as to ensure introduction of a catalyst for the process of reduction of calcium sulphate and sulphur dioxide which is represented by the ash resulting from coals, it is advisable to use coal with an ash content of from 15 to 45% as the carbonaceous component in the stage of the charge granulation.

To obtain low-dust sulphur-containing gases effluent from the furnace top and to lower the degree of agglomeration of the charge granules, it is desirable to use, as the lump carbonaceous material, coke or anthracite.

The process according to the present invention makes it possible to produce elemental sulphur in a yield of 80-95% of its content in the starting calcium sulphate.

Owing to the use of a high ash-content coal for the preparation of the charge and supply of a lump carbonaceous material directly into the calcination furnace it becomes possible to substantially improve mechanical properties of the material processed in the furnace and stabilize the conditions of the furnace operation.

As it has been already mentioned hereinbefore, the maximum temperature of heating of the charge granules is maintained equal to 1,100°-1,200° C. At a temperature of below 1,100° C. the process of reduction of calcium sulphate is not sufficiently intensified, whereas it is inexpedient to heat the charge granules above 1,200° C. due to agglomeration of the material heated in the furnace.

Increasing the mass ratio of carbon supplied to granulation in the composition of the carbonaceous component to calcium sulphate above 0.09:1 results in occurrence of an undesirable reaction of the formation of calcium sulphide:

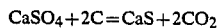

$$CaSO_4 + 2C = CaS + 2CO_2$$

The resulting calcium sulphide is oxidized in the lower section of the vertical calcination furnace with oxygen of an oxygen-containing gas to calcium sulphate according to the reaction (4), wherefore the yield of sulphur drops to 68-77% of its content in the initial feedstock.

At the same time, lowering of the mass ratio of carbon supplied to granulation in the carbonaceous component to calcium sulphate below 0.08:1 results in a lowered degree of conversion of calcium sulphate and the yield of the product sulphur is reduced too.

Increasing the mass ratio of carbon supplied to the vertical calcination furnace in the lump carbonaceous material to the charge granules above 1:3 as calculated for dry solides causes elevation of temperature of the heated granules above 1,200° C. which is undesirable for the above-mentioned reason. Lowering of the above-specified ratio below 1:10 results in an incomplete reduction of sulphur dioxide according to the reaction (2) so that the yield of elemental sulphur does not exceed 75-80% of its content in the starting feedstock.

Since the reduction of sulphur dioxide to elemental sulphur according to the reaction (2) is completed in the upper bed of the mixture of the charge granules with the lump carbonaceous material, the maintenenance of temperature of this bed within the range of 500° to 600° C. ensures the shift of the equilibrium of this reaction towards a higher yield of elemental sulphur reaching 92-95%. A further lowering of temperature of this bed is undesirable due to a possible condensation of the forming vapours of sulphur in gas ducts (prior to the condenser), whereas keeping this bed at a temperature above 600° C. lowers the equilibrium yield of sulphur according to the reaction (2) below 92%.

The use of coal with an ash-content of less than 15% in the stage of the charge granulation does not ensure preservation of the granules' integrity during heating in a vertical calcination furnace and does not lower their liability to agglomeration, thus reducing the yield of the product sulphur. At the same time, an excessive ash content of coal above 45% lowers the specific productivity of the furnace in respect of sulphur.

DETAILED DESCRIPTION OF THE INVENTION

The process for producing sulphur from calcium sulphate according to the present invention is practiced in the following manner.

The starting calcium sulphate employed as phosphogypsum or naturally-occurring gypsum or naturally-occurring anhydrite is subjected, when required, to drying in a drier unit. Then the starting material is disintegrated, if necessary, to a powder-like state, intermixed with a powder-like carbonaceous component such as coal fines, finely divided coke and the resulting mixture is moistened with water (or another binding liquid). Thereafter the charge is granulated to give charge particles of 10-20 mm size which are partly dehydrated, when required. The thus-produced charge granules are added with a required amount of a lump-like carbonaceous material such as anthracite, coal or petroleum coke. This lump-like carbonaceous material can be of any shape with lump size comparable with the size of the charge particles. Furthermore, it is possible to use the lump carbonaceous material in a briquet form.

The resulting mixture of the charge granules with the lump carbonaceous material is fed into a charging means located in the upper section of the vertical calcination furnace. Simultaneously with the charging of the above-mentioned solid mixture into the lower section of the furnace a counter-current flow of an oxygen-containing gas such as air or a mixture of oxygen with nitrogen is supplied to keep burning of the lump carbonaceous material. The above-mentioned solid mixture charged into the vertical calcination furnace is moving downwardly in a continuous current and becomes gradually heated, as it moves along the furnace, to a temperature of 1,100°-1,200° C. (the maximum heating temperature). The maximum heating temperature is maintained within the above-mentioned limits by adjusting the supply rate of the oxygen-containing gas fed into the bottom portion of the vertical calcination furnace and the mass ratio of the charge granules to the lump carbonaceous material.

The level of the upper bed of the mixture of the charge granules with the lump carbonaceous material is maintained constant in the calcination furnace.

At a temperature within the range of from 800° to 1,200° C. burning of the lump carbonaceous material occurs in the calcination furnace with the formation of carbon monoxide and carbon dioxide, as well as reduction of calcium sulphate with carbon and carbon monoxide to form sulphur dioxide and calcium oxide according to the reactions (I) and (6):

$$CaSO_4 + C = CaO + SO_2 + CO \qquad (6)$$

Sulphur dioxide while ascending in the calcination furnace passes into its cooler section, wherein it is reduced on the lump carbonaceous material to elemental sulphur according to the reaction (2) at a temperature within the range of from 500° to 800° C.

In the above-mentioned upper less heated portion of the calcination furnace the bed of the charge granules with the lump carbonaceous material is maintained at a temperature within the range of from 500° to 600° C. which ensures a high yield of elemental sulphur (up to 95% of its content in the raw materials). Since the reaction of reduction of sulphur dioxide with carbon to elemental sulphur occurring in the above-mentioned part of the furnace is of an exothermal character, it is necessary to ensure a forced removal of the heat to maintain temperature of the above-mentioned upper bed of the furnace within the range of from 500° to 600° C. The heat removal from the upper layer is effected either by way of charging granules of the charge into the furnace at a moisture content of from 12 to 20%, or by way of supplying a cool gas containing no oxygen under the upper bed of the mixture of the charge granules with the lump carbonaceous material, or by way of a forced cooling of the upper portion of the furnace using heat-exchange devices.

The reaction gases containing vapours of sulphur, nitrogen, carbon dioxide and effluent from the upper section of the furnace are cleaned to remove dust and supplied into a condenser for sulphur vapours. The gases effluent from the condenser are used, when necessary, for cooling of the above-mentioned upper layer by supplying them under this layer or for dilution (with the same purpose) of the air supplied into the bottom portion of the vertical calcination furnace.

Calcium oxide which is formed according to the reactions (I) and (6) is discharged from the bottom portion, then it is cooled and used in a traditional manner.

For a better understanding of the present invention, some specific examples are given hereinbelow by way of illustration.

EXAMPLE 1

1,000 kg of a dried powder-like phosphogypsum (moisture content of 10%) containing 855 kg of $CaSO_4$ are mixed with 125 kg of coal of a particle size of 5-100 μm, ash content of 45% containing 68 kg of carbon; the resulting charge with the mass ratio of carbon to calcium sulphate equal to 0.08:1 is granulated in a disc granulator with the addition of 200 kg of water. The resulting granules of the charge with a size of 10-20 mm are charged into the vertical calcination furnace at the top thereof together with 220 kg of a lump coal coke of a fraction of 10-20 mm containing 205 kg of carbon. The mass ratio of carbon fed with the lump coke to the charge granules (as calculated for dry solids) is equal to 1:5. Simultaneously with charging of the above-mentioned solid mixture air is counter-currently supplied into the bottom section of the furnace at the rate of 0.4 m/s and at the mass ratio of air oxygen to carbon of the lump coal coke of 0.63. The solid mixture charged into the vertical calcination furnace is moved in a continuous downward current and, while moving along the furnace, it gets gradually heated to the temperature of 1,150° C. The temperature of the upper bed of the mixture of the charge granules with the lump coal coke is maintained in the furnace equal to 500° C., wherefore the charge granules placed into the calcination furnace are preliminarily dried to the moisture content of 18±1%.

The reaction gases containing vapours of sulphur, carbon dioxide, nitrogen and a minor amount of sulphur dioxide are removed from the top section of the furnace, cleaned to remove dust and cooled in a tubular condenser, wherein the vapours of sulphur are condensed. In this manner 185 kg of a liquid sulphur are obtained which constitutes 90% of its content in phosphogypsum. From the lower portion of the calcination furnace a solid product of the process is discharged which contains 340 kg of CaO and 35 kg of $CaSO_4$.

EXAMPLE 2

1,000 kg of dried powder-like gypsum (moisture content 10%) containing 855 kg of $CaSO_4$ are mixed with 90 kg of a powder-like naturally-occurring anhydrite and 125 kg of powder-like coal with the ash content of 30% containing 85 kg of carbon. The resulting charge with the mass ratio of carbon to calcium sulphate equal to 0.09:1 is granulated by processing in a rotary drum with the addition of 100 kg of an aqueous solution of sodium sulphite which comprises a production waste resulting from the manufacture of pulp. The charge granules are mixed with 125 kg of lump coal coke containing 115 kg of carbon to the mass ratio of the coke carbon to the charge granules of 1:10 (as calculated for dry solids). This mixture is charged at the top section of the vertical calcination furnace. The charge granules are heated in the furnace in a current of air supplied into the bottom portion of the furnace (mass ratio of air oxygen to carbon of the lump coal coke is 0.58); the maximum temperature of heating of the granules is 1,100° C. The temperature in the upper bed of the mixture of the charge granules with the coal coke is maintained at 500° C., wherefore the charge granules supplied into the vertical calcination furnace are not subjected to a preliminary drying.

185 kg of a liquid sulphur are withdrawn from the condenser which constituted 80% of its content in the starting material. A solid product containing 345 kg of CaO and 95 kg of $CaSO_4$ is discharged from the bottom section of the furnace.

EXAMPLE 3

1,000 kg of dried powder-like phosphogypsum (moisture content 9%) containing 725 kg of $CaSO_4$ are mixed with 70 kg of powder-like coal with the ash-content of 15% containing 58 kg of carbon. The resulting charge with the mass ratio of carbon to calcium sulphate equal to 0.08:1 is mixed with 90kg of water and supplied into a disc granulator. The resulting charge granules are added with 200 kg of briquets of petroleum coke containing 196 kg of carbon so that the mass ratio of carbon contained in the coke to the charge granules (as calculated for dry solids) is equal to 1:5. The resulting mixture is charged into a vertical calcination furnace. The charge granules are heated in the furnace in a current of air supplied into the bottom section of the furnace (mass ratio of air oxygen to carbon of the petroleum coke is equal to 0.60); the maximum heating temperature of the granules is 1,120° C. The temperature of the upper bed of the mixture of the charge granules with the petroleum coke is maintained equal to 520° C. by charging granules into the furnace at the moisture content of 16%. The effluent reaction gases containing sulphur vapours are cooled in a condenser to give 100 kg of a liquid sulphur which constitutes 95% of its content in the starting feedstock. From the bottom part of the furnace 500 kg of cinders are discharged which can be employed for the manufacture of Portland cement.

EXAMPLE 4

1,000 kg naturally-occurring gypsum containing 788 kg of $CaSO_4$ are partly dehydrated (moisture content 12%) in a drum drier, disintegrated in a ball mill to a particle size of 20–100 μm and mixed with 80 kg of powder-like coal with the ash content of 18% containing 83 kg of carbon; the mass ratio of carbon contained in the coal to calcium sulphate is equal to 0.08:1. The mixture is moistened with 100 kg of water and granulated in a disc granulator. The thus-produced granules are mixed with 300 kg of a lump anthracite containing 290 kg of carbon; the mass ratio of carbon contained in the anthracite to the charge granules (as calculated for dry solids) is 1:3. This mixture is charged into a vertical calcination furnace, wherein the charge granules are heated in a current of air in a mixture with gases effluent from the condenser of sulphur at their volume ratio of 5:1. The mass ratio of the air oxygen to carbon of the lump anthracite is equal to 0.71. The maximum temperature of heating of the charge granules is equal to 1,200° C. The temperature of the upper bed of the mixture of the charge granules with the lump anthracite is maintained at 600° C. by supplying, as it has been already mentioned hereinabove, a mixture of air with the gases effluent from the condenser of sulphur into the bottom section of the calcination furnace. 165 kg of a liquid sulphur are obtained in the condenser which corresponds to 85% of its content in the starting feedstock. A solid product containing 320 kg of CaO is discharged from the bottom portion of the furnace.

EXAMPLE 5

1,000 kg of naturally-occurring anhydrite are disintegrated to particles of 10–100 μm size and mixed with 90 kg of powder-like petroleum coke containing 85 kg of carbon so that the mass ratio of carbon contained in the petroleum coke to calcium sulphate is equal to 0.085:1. The mixture is moistened with 50 kg of water and granulated by compression-moulding. The resulting charge granules are added with 290 kg of lump coal coke containing 270 kg of carbon; mass ratio of carbon of the coke to the charge granules (as calculated for dry solids) is 1:4. The thus-produced mixture is charged into a vertical calcination furnace, wherein the charge granules are heated in a current of air supplied from the furnace bottom (mass ratio of the air oxygen to carbon of the coal coke is equal to 0.75). The maximum temperature of heating of the charge granules is 1,200° C. The temperature of the upper bed of the mixture of the charge granules with the coal coke is maintained at 600° C., wherefor cooling recycling gases effluent from the condenser of sulphur are supplied under this bed. In the condenser 200 kg of a liquid sulphur are obtained which corresponds to 95% of its content in the starting feedstock. 480 kg of a solid product containing 470 kg of CaO are discharged from the bottom part of the furnace.

What is claimed is:

1. A process for producing sulphur from calcium sulphate consisting essentially of:
    (a) forming granules from a powder carbonaceous component and a powder calcium sulphate having a ratio, by weight, of carbon in the carbonaceous component to calcium sulphate of from 0.08–0.09:1;
    (b) forming a mixture by intermixing the granules with lump-like carbonaceous material in a weight ratio of carbon, in the carbonaceous material, to calcium sulphate of 1:3–10;
    (c) heating a bed of the mixture of granules and lump-like carbonaceous material in a vertical calcination furnace, by countercurrently contacting the bed of the mixture with an oxygen containing gas, to maintain a maximum bed temperature of from 1,100°–1,200° C., and a temperature at the upper portion of the bed of from 500°–600° C., and
    (d) condensing sulphur from the effluent gases from the furnace.

2. A process of claim 1, wherein the powder carbonaceous material has an ash content of from 15 to 45% by weight.

3. A process of claim 1, wherein the lump-like carbonaceous material is coke.

4. A process of claim 2, wherein the lump-like carbonaceous material is coke.

5. A process of claim 1, wherein the lump-like carbonaceous material is anthracite coal.

6. A process of claim 2, wherein the lump-like carbonaceous material is anthracite coal.

7. A process of claim 1, wherein the temperature in the upper portion of the bed is maintained in the range of 500°–600° C. by supplying cooled effluent gas to the upper portion of the bed.

8. A process of claim 2, wherein the temperature in the upper portion of the bed is maintained in the range of 500°–600° C. by supplying cooled effluent gas to the upper portion of the bed.

9. A process of claim 1, wherein the temperature in the upper portion of the bed is maintained in the range of 500° to 600° C. by providing the mixture, having a moisture content of from 12% to 20% by weight, to the bed.

10. A process of claim 2, wherein the temperature in the upper portion of the bed is maintained in the range of 500° 600° C. by providing the mixture, having a moisture content of from 12% to 20% by weight, to the bed.

* * * * *